(12) United States Patent
Kaltenbach et al.

(10) Patent No.: US 7,634,338 B2
(45) Date of Patent: Dec. 15, 2009

(54) METHOD FOR STEERING AND REGULATING THE DRIVING DYNAMICS IN VEHICLES WITH HYBRID DRIVE

(75) Inventors: Johannes Kaltenbach, Friedrichshafen (DE); Claus Granzow, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 607 days.

(21) Appl. No.: 11/242,759

(22) Filed: Oct. 4, 2005

(65) Prior Publication Data

US 2006/0076915 A1 Apr. 13, 2006

(30) Foreign Application Priority Data

Oct. 9, 2004 (DE) ............ 10 2004 049 324

(51) Int. Cl.
*B62D 6/00* (2006.01)
*G05D 3/00* (2006.01)
*G06F 7/00* (2006.01)
*G06F 17/00* (2006.01)
*B60K 6/20* (2007.10)
*B60K 6/52* (2007.10)

(52) U.S. Cl. .................. 701/41; 701/48; 701/69; 701/71; 701/81; 701/84; 180/65.21; 180/233; 180/236; 903/902; 903/916

(58) Field of Classification Search ............ 701/1, 701/22, 73, 82, 84, 89–93, 41–43, 48–49, 701/53–54, 58, 69–72, 74–76, 81, 87; 180/65.1, 180/65.2, 65.3, 656, 233, 243, 245, 248, 180/65.21, 65.22, 65.225, 65.23, 65.235, 180/65.24, 65.25, 65.26, 236, 242, 252, 234; 903/902, 905, 906, 915, 916, 947, 946

See application file for complete search history.

(56) References Cited

U.S. PATENT DOCUMENTS 6,549,840 B1 4/2003 Mikami et al.

FOREIGN PATENT DOCUMENTS

| DE | 29 29 497 | 2/1981 |
|---|---|---|
| DE | 43 06 381 A1 | 11/1993 |
| DE | 198 58 348 A1 | 6/2000 |
| DE | 100 49 567 A1 | 10/2001 |

*Primary Examiner*—Edward Pipala

(74) *Attorney, Agent, or Firm*—Davis & Bujold, P.L.L.C.

(57) ABSTRACT

A method for steering and regulating a driving mechanism in motor vehicles having hybrid drive. A drive torque (M) desired by the driver is distributed to at least one electric motor (Em) and a combustion engine (Vm) so that therewith the driving mechanism of the vehicle can be steered, together with the hybrid functions. In a central digital unit (1), a resulting distribution degree of the torques (M_Em, M_Vm) of at least one electric motor and of the combustion engine is determined, the sum of the torque (M_Em, M_Vm) corresponding to the drive torque (M) desired by the driver. The resulting distribution degree takes into account here requirements according to the needed hybrid and driving mechanism functions.

3 Claims, 3 Drawing Sheets

METHOD FOR STEERING AND REGULATING THE DRIVING DYNAMICS IN VEHICLES WITH HYBRID DRIVE

This application claims priority from German Application Serial No. 10 2004 049 324.3 filed Oct. 9, 2004.

FIELD OF THE INVENTION

The invention relates to a method for steering and regulating the drive mechanism in motor vehicles with hybrid drive.

BACKGROUND OF THE INVENTION

Hybrid drives have been used for a considerably long time in different types of motor vehicles. Those vehicles are known to be equipped with one combustion engine and at least one electric motor which separately or jointly, as desired, drive the wheels of at least one vehicle axle.

DE 29 29 497 A1 has thus disclosed a motor vehicle having one combustion engine and one electric motor in which optionally the combustion engine drives the vehicle front axle and the electric motor drives the vehicle rear axle. For the purpose, the electric motor is for the purpose designed as selectively engageable auxiliary drive which, in special situations such as on deep ground, snow or ice, additionally, is engaged to convert the vehicle from a two-wheel drive to a four-wheel drive.

DE 43 06 381 C2 discloses a hybrid drive for a motor vehicle having one combustion engine and one electric motor where the two prime movers, likewise, act separately on one respective vehicle axle. The combustion engine is here operated at limited rotational speed up to a presettable vehicle speed, the maximum torque and the optimal exhaust gas value being used as criteria for the selection of this reducing rotational speed and performance of the thermal drive.

In these transmission systems, the previously known hybrid functions are steered by a central digital unit. Typical hybrid functions are, for example, the electric starting off, a short-term added acceleration ("boosten") or the recuperation of braking energy by using an electric motor as generator. When added driving mechanism functions are to be implemented in those systems, an additional digital unit is needed. It is known that the driving mechanism of a vehicle can be influenced by, for example, an added steering angle or by applying a yaw torque by regulatable differential locks.

Considering this background, the problem to be solved by the invention is to introduce a method for a motor vehicle which, together with the pure steering of the hybrid functions, depending on the steering of the hybrid functions.

SUMMARY OF THE INVENTION

Accordingly, the invention originates from a motor vehicles with hybrid drive which can be driven via at least one electric motor and one combustion engine. According to the invention, the driving action of at least one electric motor and of the combustion engine differs by at least one driven axle and/or one driven wheel. With the method in a central digital unit, an input torque desired by the driver is split into one torque for at least one electric motor (Em) and one torque for the combustion engine (Vm) so as thereby to regulate and/or steer, together with the hybrid functions, also the driving mechanism of the motor vehicle. The sum from the torques for at least one electric motor and the combustion engine corresponds here to the drive torque desired by the driver.

The problem can be solved, according to the invention, by the fact that in one central digital unit, a distribution of one drive torque desired by the driver to at least one electric motor and the combustion engine is determined. Therefore, the requirements corresponding to the hybrid steering and the driving mechanism regulation are superimposed in the central digital unit. Therefrom is then calculated a distribution of the drive torque to at least one electric motor and the combustion engine. To determine the distribution, one distribution degree is calculated which corresponds to the ratio of the torque of at least one electric motor to the drive torque. The sum of the torques of at least one electric motor and of the combustion engine corresponds hereto the drive torque desired by the driver.

According to the invention, the wheels and/or axles to be driven can be separately steered. By an independent steering of the individual drive wheels or axles by at least one electric motor, different situations of driving dynamics can be taken up.

As a result of the individual steering of the separate drive wheels and/or axles, it is possible to produce a yaw torque. The driving dynamics and the driving properties of a motor vehicle can be influenced by applying a yaw torque.

Thus, the driving stability of a vehicle can be increased, for example. It is known that the maximum transmissible forces in longitudinal and transverse directions depend on each other. If longitudinal and transverse forces simultaneously appear in one wheel, the force resulting therefrom cannot exceed a specific limiting value. By an individual torque distribution in the drive train, the longitudinal forces on the wheels can be influenced and thus indirectly also the lateral force potential on the individual wheels. A change of the lateral forces then generally results in a change of the torque balance around the vehicle high axle. In this manner, by adjusting different lateral forces on the front and rear axles, it is possible to introduce a yaw torque which allows the vehicle to become more stable or quicker according to the driving situation.

When cornering, if a vehicle inclines approximately to oversteering, this can be counteracted by a high torque portion on the front axle. Thereby a small yaw torque acts upon the vehicle so that the driving characteristic becomes neutral again. In an understeering driving situation, the torque portion of the rear axle can be increased accordingly. Thereby the drive torque of the rear axle is increased and the lateral force potential diminishes. On the front axle, the lateral force potential is increased at the same time which, as a whole, takes effect in an additional yaw torque in direction to the inner side of the curve.

The individual steering characteristic of a vehicle can thus be influenced. By a yaw torque, a vehicle can be stabilized even in a limit zone, it being possible that this stabilization is combined also with a brake engagement, for example. The inventive method thus makes it possible to take the requirements of the driving mechanism regulation into account with the steering of the hybrid functions.

With the inventive method, all-wheel functions of a motor vehicle can be implemented much better than in all-wheel driving according to the prior art, since there are no mechanical limitations in the distribution of the drive torque to the electrically driven wheels.

In an advantageous application of the inventive method, the combustion engine is connected by driving technology with the rear axle of the motor vehicle while one of two electric motors is in driving connection respectively with one of the two front wheels.

As an alternative to this, the inventive method can also be applied in hybrid drive mechanisms where the combustion engine drives the front axle of the motor vehicle while two electric motors are connected by driving technology respectively with one of the two rear wheels. Likewise, a single electric motor can naturally drive two drive wheels, said drive wheels being each energized via a separate clutch. In another development, it is possible that to the drive torque in at least one of the wheels of the axle driven by the combustion engine, at least one electromotor drive torque is superimposed. An overlay transmission is, in addition, needed for this.

In these alternatives, it proves advantageous that the degree of freedom of distribution of the drive torque be higher than in a conventional all-wheel system with distributor transmission, longitudinal and transverse locks. By manufacturing, for example, two separate electric motors, which distribute their drive torques separately to drive wheels of one axle, it is possible to implement driving adjustments not perceived as disturbing by the driver and, at the same time, clearly to improve the driving properties of a vehicle thus equipped in comparison with the already known technical solutions. Thus, for example brake engagements, relative to this controlled by an ESP system according to the prior art, can be more clearly detected for the vehicle occupants.

Another advantage of the inventive method can be implemented vis-a-vis a known active front steering AFS. In such a superimposed steering drive, where a steering angle, manually adjusted by the driver on the steering wheel, is superimposed with a steering wheel angle generated by an electric motor, the torque of the electric motor supports itself on the steering wheel. Thereby the driver detects one such autonomous steering engagement.

However, in a method designed according to the invention, said steering engagement is not necessarily detectable, since an autonomous steering engagement can already be implemented by different driving rotational speeds for the drive wheels driven by at least one electric motor. Additional, emergency steering functions can also be implemented by the improved steering response.

It is to be mentioned at this point that with the inventive method, all known hybrid functions obviously can be steered, the same as all known driving mechanism functions regulated. Together with a drive purely by combustion engine and an exclusively electric drive in which the combustion engine is uncoupled from the drive train, here the combined drive is possible, that is, an arbitrary division of the drive torque between the combustion engine and the electric motors.

BRIEF DESCRIPTION OF THE DRAWINGS

The invention will now be described, by way of example, with reference to the accompanying drawings in which.

DETAILED DESCRIPTION OF THE INVENTION

Figure 1:
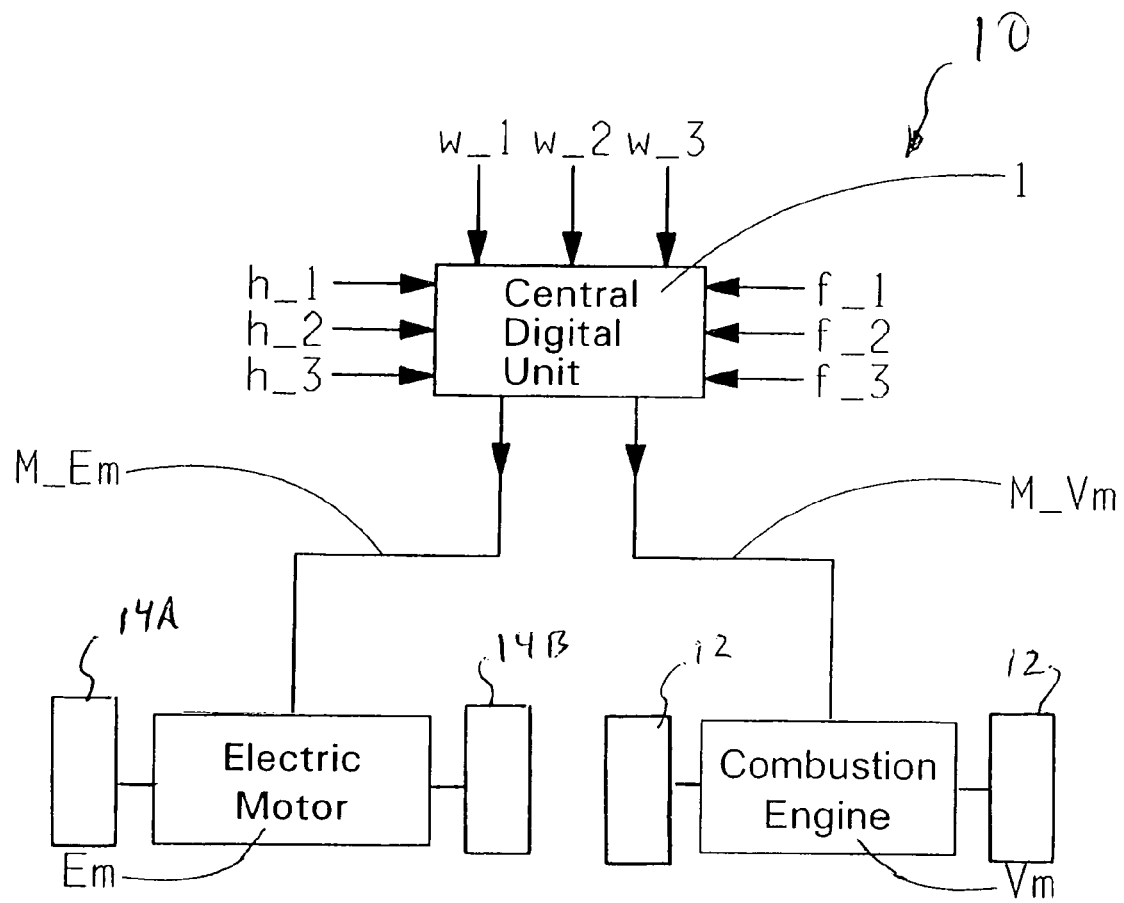
FIG. 1 is a diagrammatic representation of the invention.

FIG. 1 shows a diagrammatic representation of the inventive method for controlling the distribution of torque to the wheels of a vehicle and for thereby controlling the steering behavior of the vehicle by controlling the distribution of torque to the wheels of the vehicle as implemented in a vehicle drive system 10. Here in a central digital unit 1 enter different measuring values h_1-h_3, w_1-w_3, f_1-f_3. From the central digital unit 1 originate at least two values consisting of M_Em, M_Vm which represent nominal standards for the torque of at least one electric motor Em and of a combustion engine Vm. These are relayed to at least one electric motor EM and the combustion engine Vm wherein the combustion engine Vm in turn provides torque to a first pair of wheels 12 of the vehicle and each electric motor Em of the at least one electric motor Em provides torque to a corresponding one or both of a second pair of wheels 14A, 14B of the vehicle.

Figure 2:
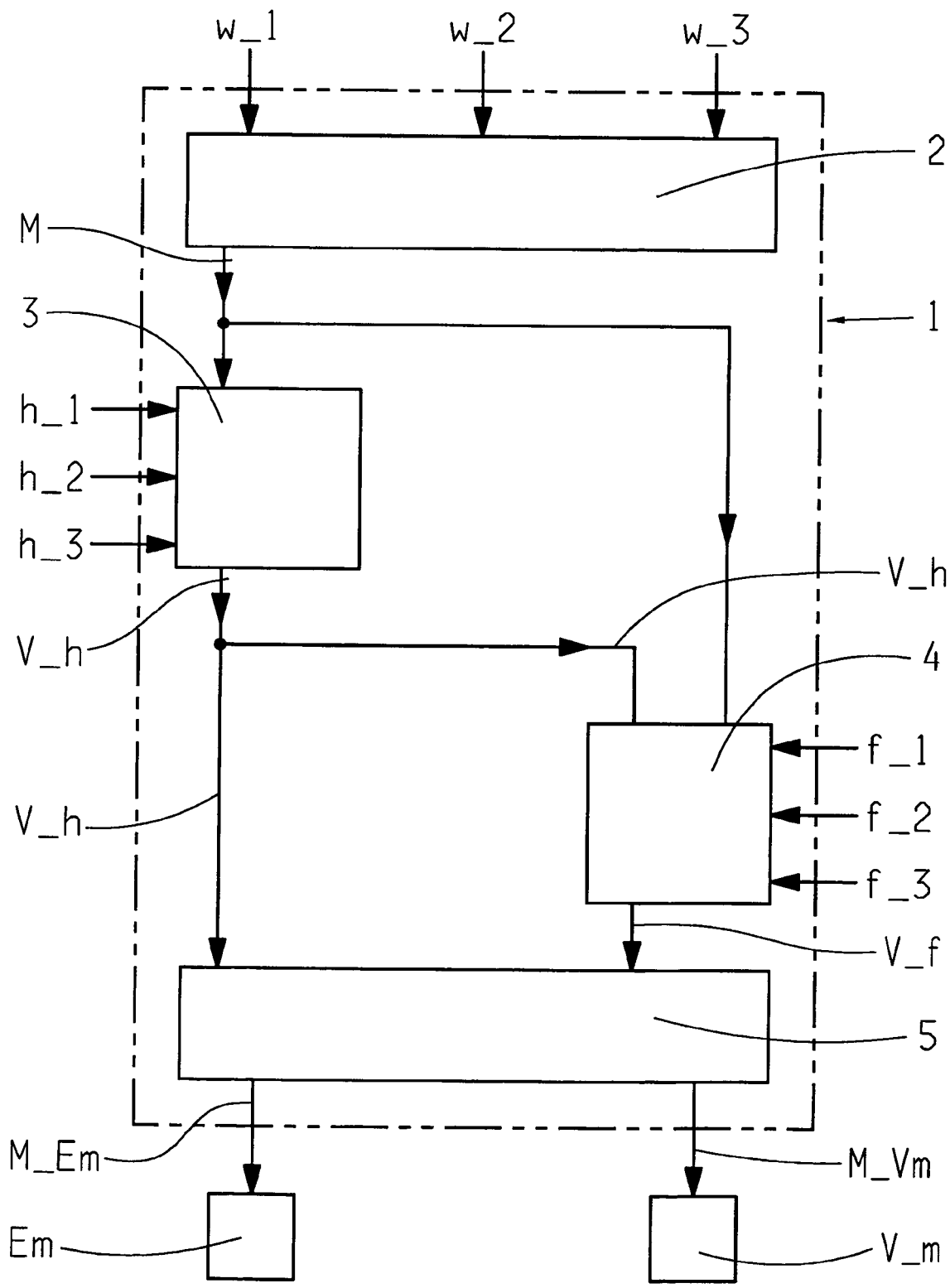
FIG. 2 is another diagrammatic representation of the invention.
Figure 3:
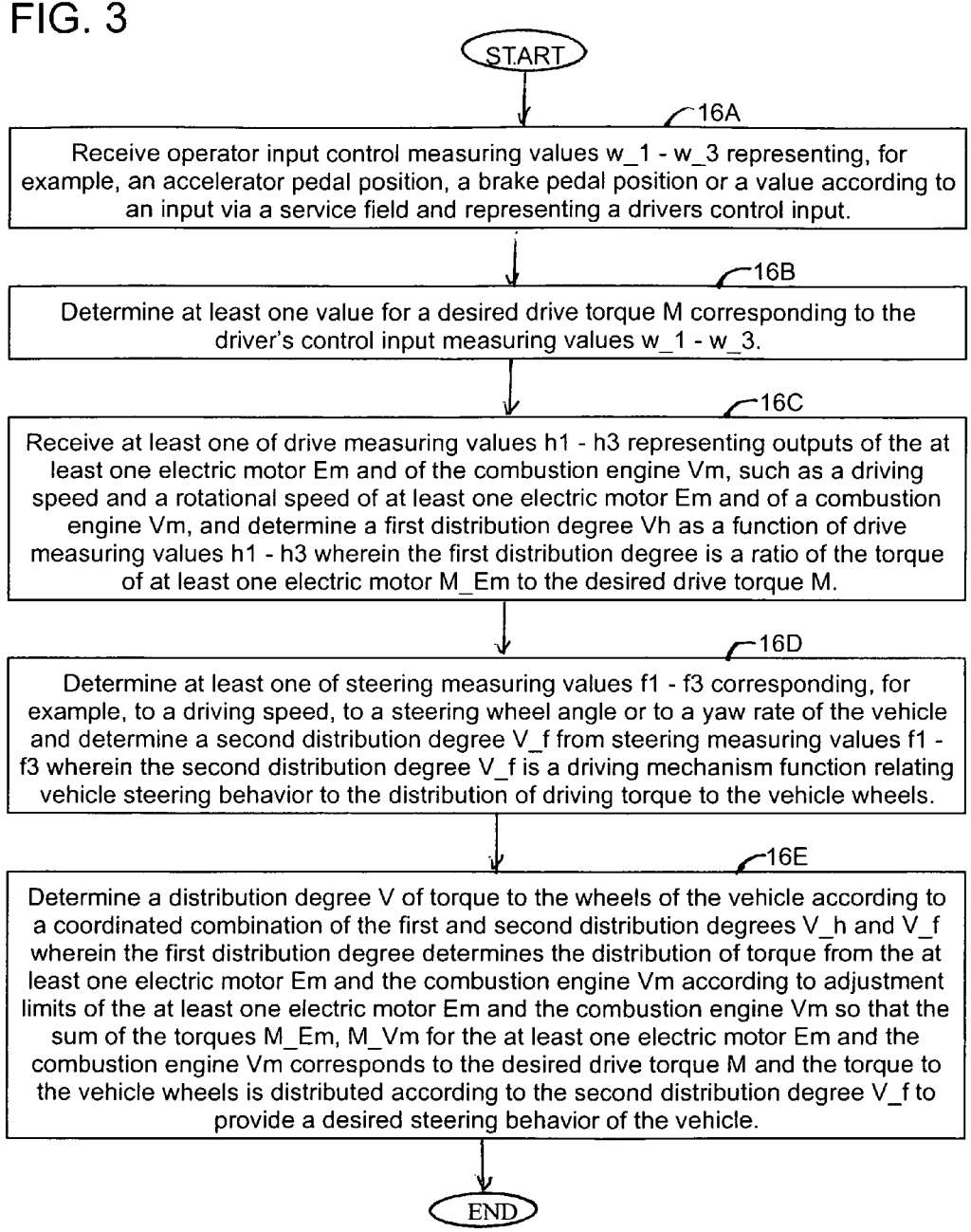
FIG. 3 is a flow diagram of the present invention.

FIG. 2 is a further detailed representation of the vehicle drive system 10 and FIG. 3 is a flow diagram of the operation of the vehicle drive system 10 as illustrated in FIG. 2. In the central digital unit, a first module 2 is shown where a driver's wish is determined [Step 16A]. In this first module 2 are entered measuring values w_1-w_3 corresponding, for example, to the accelerator pedal position, to the brake pedal position or to a value according to the input via a service field. From the first module 2, at least one value for a drive torque M corresponding to the driver's wish [Step 10B] is passed to one control unit 3 and one regulating unit 4. In the control unit 3 further enter [Step 16C] at least measuring values h_1-h_3 corresponding, for example, to the driving speed and the rotational speeds of at least one electric motor Em and of the combustion engine Vm. In this control unit 3, a first distribution degree V_h is calculated by way of the values entered corresponding to the hybrid functions. A distribution degree corresponds here to the ratio of the torque of at least one electric motor M_Em to the drive torque M. The first distribution degree V_h is relayed to the regulation unit 4 and to a coordinator step 5. In the regulation unit 4, [Step 16D] further enter at least measuring values f_1-f_3 corresponding, for example, to the driving speed, to the steering wheel angle or to the yaw rate of the vehicle. In the regulation unit 4, a second distribution degree V_f is calculated therefrom corresponding to the driving mechanism functions. The first and second distribution degrees V_h, V_f are both passed to the coordinator step 5. Taking into account adjusting limits of the motors Em, Vm, to be previously determined, there is determined [Step 16E] a resulting distribution degree V. According to this resulting distribution degree, the torques M_Em, M_Vm for at least one electric motor EM and the combustion engine Vm are determined in the coordination step 5 and relayed to at least one electric motor Em and the combustion engine Vm. The sum of the torques M_Em, M_Vm for at least one electric motor Em and the combustion engine Vm corresponds here to the drive torque M.

REFERENCE NUMERALS

1 central digital unit
2 first module
3 control unit
4 regulation unit
5 coordinator step
10 vehicle drive system
12 first pair of wheels
14A, 14B second pair of wheels
Em at least one electric motor
M drive torque
Vm combustion engine
f_1-f_3 measuring values
h_1-h_3 measuring values
w_1-w_3 measuring values
M_Em torque electric motor M_Vm torque combustion engine
V_h distribution degree
V_f distribution degree

The invention claimed is:

1. A method for regulating a vehicle drive mechanism and controlling a steering behavior of the vehicle, the drive mechanism including a combustion engine (Vm) driving a first pair of wheels of the vehicle and at least one electric motor (Em) driving a second pair of wheels of the vehicle, the method comprising the steps of:
   receiving driver input control measuring values (w_1-w_3) representing a driver control input;
   determining at least one value for a desired drive torque (M) corresponding to the driver input control measuring values (w_1-w_3);
   receiving at least one of drive measuring values (h1-h3) representing outputs of the at least one electric motor (Em) and of the combustion engine (Vm); and
   determining a first distribution degree (V_h) as a function of drive measuring values (h1-h3) wherein the first distribution degree (V_h) is a ratio of the torque of at least one electric motor (M_Em) to the desired drive torque (M);
   determining at least one of steering measuring values (f1-f3) representing a steering behavior of the vehicle; and
   determining a second distribution degree (V_f) from steering measuring values (f1-f3) wherein the second distribution degree (V_f) is a driving mechanism function relating vehicle steering behavior to the distribution of driving torque to the vehicle wheels;
   determining a distribution degree (V) of torque to the wheels of the vehicle according to a combination of the first and the second distribution degrees (V_h and V_f) wherein the first distribution degree determines a distribution of torque to the wheels from the at least one electric motor (Em) and the combustion engine (Vm) according to adjustment limits of the at least one electric motor (Em) and the combustion engine (Vm) so that,
   the sum of the torques (M_Em and M_Vm) for the at least one electric motor (Em) and the combustion engine (Vm) corresponds to the desired drive torque (M) and so that the sum of the torques (M_Em and M_Vm) are within the adjustment limits of the at least one electric motor (Em) and the combustion engine (Vm); and
   the torque to the vehicle wheels is distributed according to the second distribution degree (V_f) to provide a desired steering behavior of the vehicle.

2. The method of claim 1 for regulating a vehicle drive mechanism and controlling a steering behavior of the vehicle, wherein:
   the driver input control measuring values (w_1-w_3) represent at least one of an accelerator pedal position, a brake pedal position or a value according to an input via a service field and representing a driver control input.

3. The method of claim 1 for regulating a vehicle drive mechanism and controlling a steering behavior of the vehicle, wherein:
   the drive measuring values (h1-h3) represent at least one of a driving speed and a rotational speed of at least one electric motor (Em) and of a combustion engine (Vm).

* * * * *